United States Patent [19]

Bischopink

[11] Patent Number: 4,736,957
[45] Date of Patent: Apr. 12, 1988

[54] STRESSING ARRANGEMENT

[75] Inventor: Klaus Bischopink, Duesseldorf, Fed. Rep. of Germany

[73] Assignee: Rheinmetall GmbH, Duesseldorf, Fed. Rep. of Germany

[21] Appl. No.: 700,319

[22] Filed: Feb. 11, 1985

[30] Foreign Application Priority Data

Feb. 10, 1984 [DE] Fed. Rep. of Germany ....... 3404677

[51] Int. Cl.$^4$ .............................................. B23B 31/20
[52] U.S. Cl. ................................ 279/2 R; 279/1 DC; 279/50; 279/57
[58] Field of Search ................ 279/2 R, 1 DC, 1 ME, 279/1 A, 28, 43, 47, 50, 53, 57, 70, 83, 87, 99, 100, 101, 1 R, 34, 42, 48, 49, 55, 56, 69, 121; 408/239 R

[56] References Cited

U.S. PATENT DOCUMENTS

| | | | |
|---|---|---|---|
| 2,372,592 | 3/1945 | Lovely | 279/1 DC |
| 2,471,921 | 5/1949 | Ashdown | 279/50 |
| 2,967,462 | 1/1961 | Yogus | 408/329 R X |
| 3,246,908 | 4/1966 | Sattler | 279/47 |
| 3,921,993 | 11/1975 | Ingham et al. | 279/50 |
| 3,926,447 | 12/1975 | Cox, Jr. | 279/50 X |

*Primary Examiner*—Gil Weidenfeld
*Assistant Examiner*—Glenn L. Webb

[57] ABSTRACT

A stressing arrangement for workpieces of cylindrical or at least partially cylindrical shape including a housing which coaxially surrounds the workpiece. For the purpose of temporarily fixedly holding the workpiece for further working, in particular for machining, stressing means are mounted in the housing. The stressing means include a pair of stress pincers, each one of which consists of a plurality of segments, and a pair of pressuring rings. The stress pincers and pressure rings have confronting conical surfaces adapted to coact with each other so that when the pair of pressure rings move apart a radial inward stress is imparted on the workpiece by the stress pincers. A plurality of stressing bolts are threadably mounted in at least one of the pair of pressure rings to selectively cause them to move toward each other or apart from each other.

3 Claims, 2 Drawing Sheets

STRESSING ARRANGEMENT

BACKGROUND OF THE INVENTION

There is known, for the purpose of stressing workpieces which are to be machined, to use hydraulically operated stretching mechanisms, in which a portion of the thin-walled inner bore is loaded with a stressing pressure by means of a hydraulic medium and the workpiece is thus tightly stressed. This known stretch-stresser, which only permits a slight deviation of the nominal diameter of the workpiece, operates only satisfactorily when a constant ambient state prevails, which under normal working conditions cannot always be guaranteed. For example, with minor leaking losses of the hydraulic medium or when an upper or lower temperture limit is exceeded, the stress safety can longer be maintained. When the plant operation is down such stretch-stressing machines must be kept in chambers with predetermined constant temperature in order to permit the start-up of the machine when restarting the plant. The slightest leak, which has been described hereinabove, inhibits the stress safety, and requires, furthermore, costly and time-consuming repairs.

SUMMARY OF THE INVENTION

It is an object of this invention to provide a new type of stretching and or stressing arrangement in which these drawbacks are avoided and despite comparatively simple construction permits the stretching and or stressing of workpieces in an environment that has a large temperature range in practice.

In view of the fact that the stressing arrangement operates exclusively with mechanical means, the afore-described drawbacks of the conventional hydraulic stressing arrangements are completely avoided: A safe stressing of the to be worked workpiece is possible without complex preparations at all possible ambient temperature conditions that may occur during the normal operation of the arrangement.

BRIEF DESCRIPTION OF THE DRAWING

With these and other objects in view, which will become apparent in the following detailed description, the present invention, which is shown by example only, will be clearly understood in connection with the accompanying drawing, in which.

DETAILED DESCRIPTION

Figure 1:
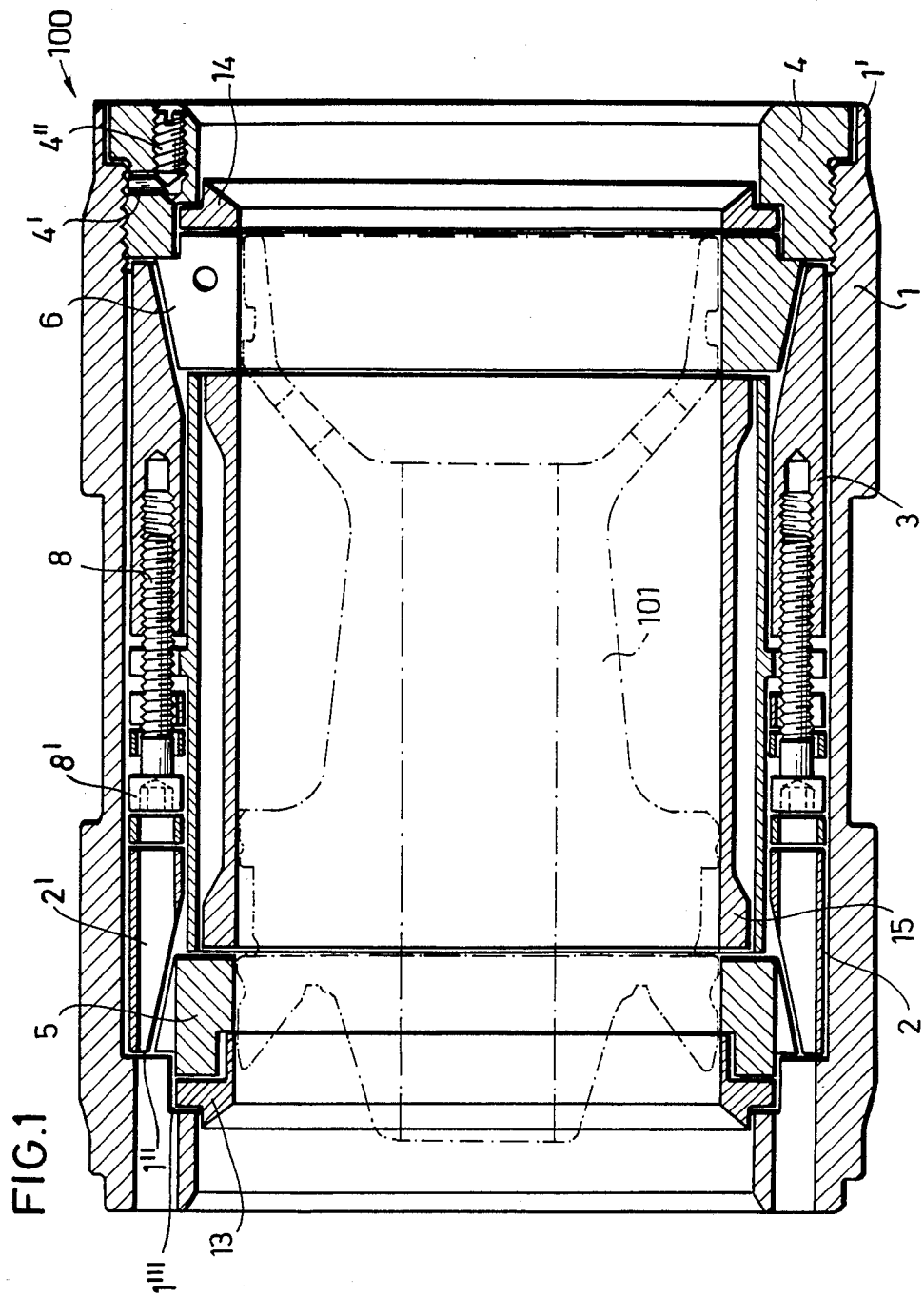
FIG. 1 is a longitudinal sectional view through the stressing arrangement of the invention.
Figure 2:
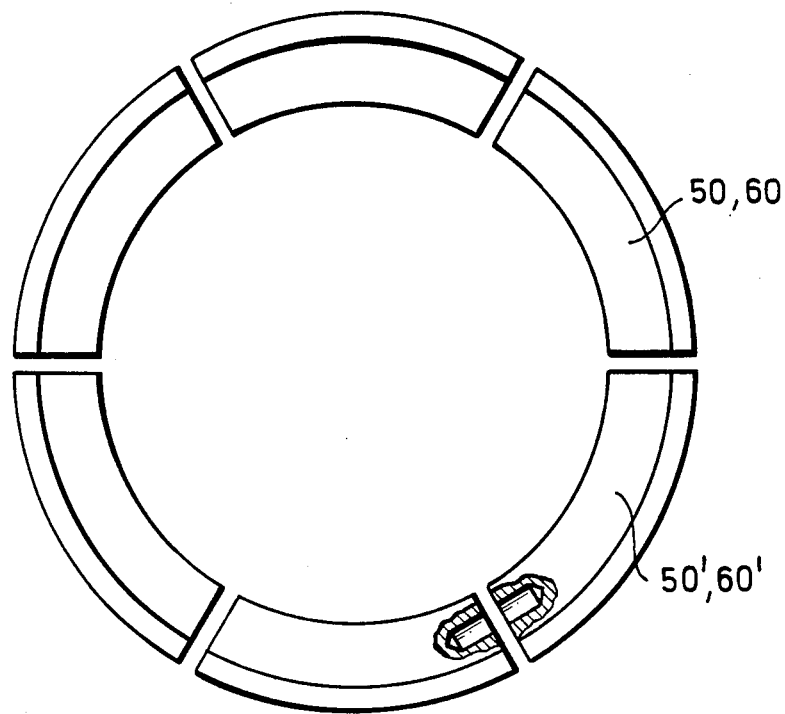
FIG. 2 is a front-elevational view of stressing pincers forming part of the stressing arrangement according to FIG. 1.

The stressing arrangement 100 includes first of all a substantially hollow cylindrically shaped housing 1 which coaxially surrounds the gripped workpiece 101 and which also serves for supporting the stressing means. Two stress pincers 5, 6 are provided, preferably respectively consisting of six segments 50, 60, which with their inner surfaces, proximate to the axis, abut against the at least partially cylindrical outer contour of the workpiece 101 which is to be mounted therein and by effecting a radially inwardly directed pressure clamped the workpiece therebetween. This applied pressure is, as will be explained hereinafter, applied via stressing bolts 8 which coact with pressure rings 2 and 3. The edge surfaces of the stress pincers 5, 6 which are disposed radially outwardly, respectively their segments 50, 60, are formed as frusto-conically shaped surfaces and are in contact with similarly shaped surfaces of the pressure rings 2 and 3, which are loaded by means of the stressing bolts 8 (by inserting a non-illustrated tool through the bores 2', 1'', 1''' into blind bore 8' in the head of bolt 8). When the stressing bolts are loaded the pressure rings 2, 3 are moved apart in an axial direction, which has as a consequence, that their frusto-conically shaped inner surfaces slide up on the frusto-conically shaped outer surfaces of the stress pincers 5, 6 and thereby the segments 50, 60 of the stress pincers 5, 6 are pressed inwardly in a radial direction, whereby the workpiece 101 disposed in the housing 1 is firmly clamped.

The stressing and releasing of the stressing bolts 8 results by means of a tool that is insertable in the end face of the stressing arrangement via bores 2', 1'', 1''' into blind bore 8', for example an hexagonally shaped key, which can be inserted via bores 2' disposed in the pressure ring 2 into the head of the stressing bolts 8. The stressing means for the stressing pincers 5, 6, pressures rings 2, 3 and stressing bolts 8 are fixed within the housing 1 by means of spacer rings, respectively spacer bushings 13, 14, 15, the functioning of which is evident to those skilled in the art when examining the drawing of FIG. 1 and therefore requires no further explanation. The end of the housing 1 which faces away from the actuating head of the stressing bolts 8 is provided with an internal thread into which a threaded ring 4 may be threadably inserted, which forms in coaction with the spacer ring 14 a stop in an axial direction for the stress pincer 6 as well as for the pressure ring 3. For securing the threaded ring 4 against an undesirable rotation a plurality, preferably three, safety bolts 4' are provided, which are mounted in bores in the threaded ring 4 so as to be movable in a radial direction and which are pressed against the thread present in the inner wall of the housing 1. The end pieces of the safety bolts 4' which confront the longitudinal axis of the housing 1 terminate in a skewed surface, which bears against another mating skewed surface of the threaded bolts 4'', whose inner ends are conically shaped. The said bolts 4' are disposed parallel to the longitudinal axis of the stressing arrangement in threaded bores of the threaded ring 4. When these said bolts 4' are screwed in there is effected via the skewed surfaces of the safety bolts 4' a force component in a radially outward direction on the safety bolts 4' so that the latter can be pressed against the inner threaded wall of the housing 1.

The stressing arrangement makes it possible that a reliable clamping of a workpiece 101 which is to be worked can be achieved. Moreover, this arrangement is compact and presents no adaptation problems while being at the same time capable of coacting with a high performance working machine.

Although a single embodiment of the invention has been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention, as will now be apparent to those skilled in the art.

I claim:

1. In a stressing arrangement for cylindrically shaped workpieces or workpieces which have at least a partial cylindrical outer contour, which arrangement includes a housing which coaxially encompasses the workpiece and stressing means operatively mounted in said housing, the improvement comprising,
   (a) two pincer rings are coaxially movably mounted in said housing, each pincer ring being made up of a plurality of arcuate segments, each one of said segments having an inner cylindrical surface abutting against the cylindrically shaped region of the workpiece and an outer conical surface;
   (b) two pressure rings axially spaced from each other which are axially movably mounted relative to each other in the housing, each pressure ring having an inner conical surface adapted to matingly contact an outer conical surface of a confronting segment of a pincer ring;
   (c) at least one of a plurality of pressure bolts is threadably mounted in one pressure ring of said pair of pressure rings and such pressure bolt is adapted to move said pair of pressure rings either towards each other to unload said pressure rings or away from each other to load said pressure rings; and
   spacing means operatively mounted in said housing for coaction with said pincer rings and pressure rings to maintain them in operative positions in said housing; said spacing means include at least one ring member which is threadably mounted at one end of said housing.

2. In a stressing arrangement for cylindrically shaped workpieces, the improvement as set forth in claim 1, wherein said threadably mounted ring member has a plurality of radially extending first bores, a corresponding plurality of safety pins slidably mounted in said plurality of bores which are adapted to be pressed radially outwardly against the inner threaded wall of said axial end of said housing.

3. In a stressing arrangement for cylindrically shaped workpieces, the improvement as set forth in claim 2, wherein each one of said safety pins has a skewed radially inner end surface, a corresponding plurality of set screws mounted in a plurality of threaded second bores each one of which is normal to a corresponding first bore, each set screw has a conical end adapted to coact with skewed radially inner end surface of a coacting safety pin so that when said set screw is screwed home in a corresponding second bore its conical end bears against the skewed end of a corresponding safety pin to thereby press the radially outer end of the safety pin against the inner threaded wall of the axial end of the housing.

* * * * *